(12) United States Patent
Gråbæk

(10) Patent No.: US 10,526,845 B2
(45) Date of Patent: Jan. 7, 2020

(54) DOWNHOLE TOOL STRING

(71) Applicant: WELLTEC A/S, Allerød (DK)

(72) Inventor: Peter Gråbæk, Allerød (DK)

(73) Assignee: Welltec A/S, Allerød (DK)

( * ) Notice: Subject to any disclaimer, the term of this patent is extended or adjusted under 35 U.S.C. 154(b) by 21 days.

(21) Appl. No.: 15/558,433

(22) PCT Filed: Mar. 18, 2016

(86) PCT No.: PCT/EP2016/055999
§ 371 (c)(1),
(2) Date: Sep. 14, 2017

(87) PCT Pub. No.: WO2016/150862
PCT Pub. Date: Sep. 29, 2016

(65) Prior Publication Data
US 2018/0058146 A1    Mar. 1, 2018

(30) Foreign Application Priority Data
Mar. 20, 2015 (EP) .................................. 15160025

(51) Int. Cl.
| | | |
|---|---|---|
| *E21B 4/00* | (2006.01) | |
| *E21B 4/04* | (2006.01) | |
| *F16H 1/46* | (2006.01) | |
| *E21B 29/00* | (2006.01) | |
| *E21B 37/00* | (2006.01) | |

(52) U.S. Cl.
CPC .............. *E21B 4/006* (2013.01); *E21B 4/04* (2013.01); *F16H 1/46* (2013.01); *E21B 29/002* (2013.01); *E21B 37/00* (2013.01)

(58) Field of Classification Search
CPC .................................. E21B 4/02; E21B 4/006
See application file for complete search history.

(56) References Cited

U.S. PATENT DOCUMENTS

| | | | | |
|---|---|---|---|---|
| 1,790,460 | A * | 1/1931 | Capeliuschnicoff | .... E21B 4/006 |
| | | | | 175/106 |
| 4,678,045 | A * | 7/1987 | Lyons | ....................... E21B 4/00 |
| | | | | 175/100 |

(Continued)

FOREIGN PATENT DOCUMENTS

| | | |
|---|---|---|
| EP | 2 505 765 | 10/2012 |
| EP | 2 845 995 | 3/2015 |
| WO | WO 00/46481 | 8/2000 |

OTHER PUBLICATIONS

International Search Report and Written Opinion of the ISA for PCT/EP2016/055999, dated Jun. 22, 2016, 11 pages.

(Continued)

*Primary Examiner* — Giovanna C Wright
(74) *Attorney, Agent, or Firm* — Nixon & Vanderhye P.C.

(57) ABSTRACT

A downhole tool string comprising a motor unit (3) having a rotational shaft rotating with a rotational motor speed; a gear section; an operational tool having a tool shaft rotated by the gear section (5) at a lower rotational speed than that of the rotational shaft; and a pump unit (8) having a rotor shaft rotated by the motor unit (3) for providing fluid around or past an operational tool (6). The pump unit (8) is arranged between the gear section (5) and the operational tool (6).

15 Claims, 6 Drawing Sheets

(56) References Cited

U.S. PATENT DOCUMENTS

| | | | | |
|---|---|---|---|---|
| 4,744,426 A | * | 5/1988 | Reed | E21B 4/00 |
| | | | | 175/102 |
| 6,397,946 B1 | | 6/2002 | Vail, III | |
| 2004/0262043 A1 | * | 12/2004 | Schuaf | E21B 3/02 |
| | | | | 175/57 |

OTHER PUBLICATIONS

Extended EP Search Report for EP15160025.1, dated Oct. 1, 2015, 5 pages.

* cited by examiner

DOWNHOLE TOOL STRING

This application is the U.S. national phase of International Application No. PCT/EP2016/055999 filed 18 Mar. 2016, which designated the U.S. and claims priority to EP Patent Application No. 15160025.1 filed 20 Mar. 2015, the entire contents of each of which are hereby incorporated by reference.

FIELD OF THE INVENTION

The present invention relates to a downhole tool string for performing an operation downhole in a well having a well fluid, the downhole tool string having an outer diameter and comprising a motor unit having a rotational shaft rotating with a rotational motor speed; a gear section, an operational tool having a tool shaft rotated by the gear section at a lower rotational speed than that of the rotational shaft; and a pump unit having a rotor shaft rotated by the motor unit for providing fluid around or past the operational tool. Furthermore, the invention relates to a method for operating an operational tool and pump unit of a downhole tool.

BACKGROUND ART

Several intervention tools used in a well have an internal pump for providing fluid to an operational bit arranged in the front end of the tool. Thus, the pump needs a rotational input of a certain speed which is substantially higher than the rotational speed of the tool bit. The pump is therefore arranged so that fluid from the pump is supplied through a reduction gear, however, when intervening small diameter wells, this design is not appropriate as the reduction gear needs all the internal space available to avoid the gear being worn down very quickly.

SUMMARY OF THE INVENTION

It is an object of the present invention to wholly or partly overcome the above disadvantages and drawbacks of the prior art. More specifically, it is an object to provide an improved tool string having a small outer diameter while still being capable of providing fluid past the tool bit.

The above objects, together with numerous other objects, advantages and features, which will become evident from the below description, are accomplished by a solution in accordance with the present invention by a downhole tool string for performing an operation downhole in a well having a well fluid, the downhole tool string having an outer diameter and comprising:
- a motor unit having a rotational shaft rotating with a rotational motor speed,
- a gear section,
- an operational tool having a tool shaft rotated by the gear section at a lower rotational speed than that of the rotational shaft, and
- a pump unit having a rotor shaft rotated by the motor unit for providing fluid around or past the operational tool, wherein the pump unit is arranged between the gear section and the operational tool.

In an embodiment, the outer diameter of the downhole tool string may be less than 100 mm, and preferably less than 54 mm.

Furthermore, the pump unit may comprise a pump inlet in fluid communication with the well fluid.

In addition, the pump unit may comprise a pump outlet in fluid communication with the well fluid.

The pump outlet may be arranged in a circumferential wall of the pump.

The pump may expel fluid radially out into the well and suck well fluid in through the drill bit, so that the well fluid is forced past the drill bit.

The pump may have an intake of fluid through an inlet in the circumferential wall, which fluid is expelled out into the well through the drill bit, so that the well fluid is forced past the drill bit.

Moreover, the gear section may comprise a reduction gear assembly having a first end part closest to the motor unit, the first end part engaging the rotational shaft, and the reduction gear assembly further having a second end part rotating at a lower speed than the rotational shaft.

In addition, the reduction gear assembly may have a through-bore through which the rotational shaft extends.

The second end part of the reduction gear assembly may be connected to the tool shaft in a connection area.

In an embodiment, the reduction gear assembly may be a planetary gearing assembly.

In another embodiment, the reduction gear assembly may be a multi-stage planetary gearing assembly.

In yet another embodiment, the rotor shaft of the pump unit may have a pump through-bore through which the tool shaft extends.

Furthermore, the gear section may comprise a transition gear assembly arranged at the second end part of the reduction gear assembly, the transition gear assembly comprising a transition shaft having a first shaft end having a first toothed part, and a second shaft end having a second toothed part, the first toothed part engaging the rotational shaft and the second toothed part engaging the rotor shaft, so that the rotation of the rotational shaft is transferred to the rotor shaft.

The transfer of rotation may be an increase in rotation or a decrease in rotation, or the rotation may be unchanged.

The transition shaft may have an un-toothed part between the first and second toothed parts, the un-toothed part bridging over the connection area.

Moreover, the second end part of the reduction gear assembly may comprise one or more cavity/-ies in which the transition shaft(s) is/are arranged.

Also, the transition shaft may be arranged in the second end part of the reduction gear assembly.

Additionally, a plurality of transition shafts may each be arranged in one of the cavities.

The transition shaft may have a centre axis, the transition shaft rotating around the centre axis and around the rotational shaft.

Furthermore, the transition shaft may rotate at a rotational speed being greater than that of the second end part of the reduction gear assembly.

In addition, the gear section may be arranged in a housing which may be stationary.

Further, the pump unit may be connected to the stationary housing.

Also, the motor unit may be an electrical motor.

Moreover, the housing may have a toothed part engaging the planetary gearing assembly.

Additionally, at least one bearing may be arranged between the rotational shaft and the second end part of the reduction gear assembly.

Furthermore, the rotational shaft may rotate at 5,000-10,000 rpm and the second end part of the reduction gear assembly may rotate at 50-500 rpm, so that the operational tool is rotated at 50-500 rpm while the rotor shaft of the pump unit is rotated at 5,000-10,000 rpm.

In an embodiment, a bearing may be arranged between the second end part of the reduction gear assembly and the housing.

The operational tool may be a milling tool, a drilling tool, a cutting tool, a cleaning tool or a brushing tool.

The downhole tool string may further comprise a driving unit, such as a downhole tractor.

Also, the downhole tool string may further comprise an anchoring section.

Finally, the downhole tool string may further comprise a cleaner section arranged between the operational tool and the pump unit and around the tool shaft, so that elements released while operating the operational tool are sucked into the cleaner section and accumulated therein.

The present invention also relates to a method for operating an operational tool and pump unit of a downhole tool string by means of the rotational shaft of the motor unit, comprising the steps of:

activating the motor unit to rotate the rotational shaft at a first rotation speed,
  rotating the first end part of the reduction gear assembly by means of the rotational shaft,
  reducing the rotations of the second end part to a second rotation speed,
  rotating the tool shaft by means of the second end part of the reduction gear assembly,
  rotating the transition shaft by means of the rotational shaft,
  rotating the rotor shaft of the pump unit by means of the transition shaft, and
  pumping fluid around or past the operational tool while the operational tool rotates.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
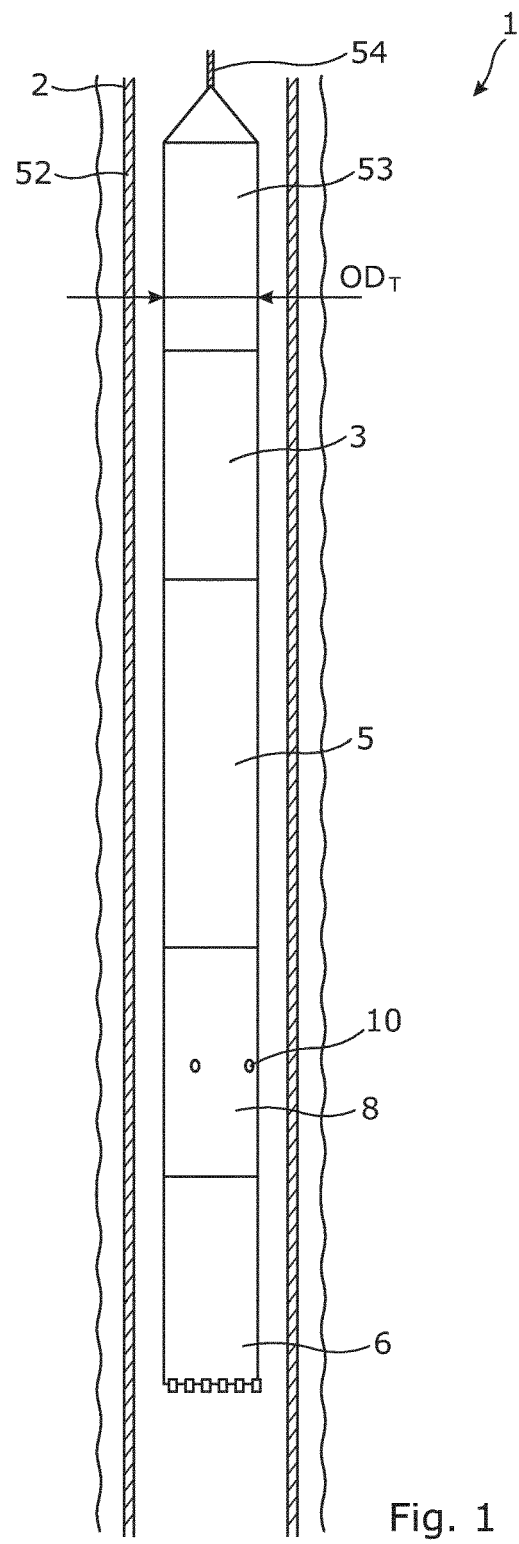
FIG. 1 shows a downhole tool string in a well downhole.

FIG. 1 shows a downhole tool string 1 for performing an operation downhole in a well 2 filled with well fluid. The downhole tool string 1 has an outer diameter $OD_T$ and comprises a motor unit 3 having a rotational shaft being the output shaft of the motor unit and rotating with a rotational motor speed. The downhole tool string 1 further comprises a gear section 5, an operational tool 6 having a tool shaft rotated by the gear section at a lower rotational speed than that of the rotational shaft, and a pump unit 8 having a rotor shaft rotated by the motor unit 3 for providing fluid around or past the operational tool. The pump unit comprises a pump inlet 10 in fluid communication with the well fluid for taking in well fluid from the well and ejecting the fluid again in the vicinity of the operational tool 6. The pump unit 8 is arranged between the gear section 5 and the operational tool 6. This is due to the fact that the outer diameter $OD_T$ of the tool is less than 54 mm, and at such a small diameter, the gear section does not leave any space for a fluid channel to run through the shaft for providing fluid from the pump to the tool. The pump unit 8 therefore has to be arranged between the gear section 5 and the operational tool 6. Furthermore, by arranging the gear section 5 between the motor unit 3 and the pump unit 8, the gear section has to deliver one rotation to the pump unit and another, lower rotation to the operational tool.

In another embodiment, the pump unit comprises a pump outlet for expelling fluid into the well, the outlet being arranged in a circumferential wall of the pump, and the well fluid is sucked in through the operational tool 6, and thus, the pump inlet is in fluid communication with the well fluid passing the drill bit. However, the fluid is flowing in an opposite direction than when using the tool shown in FIG. 1.

Figure 2:
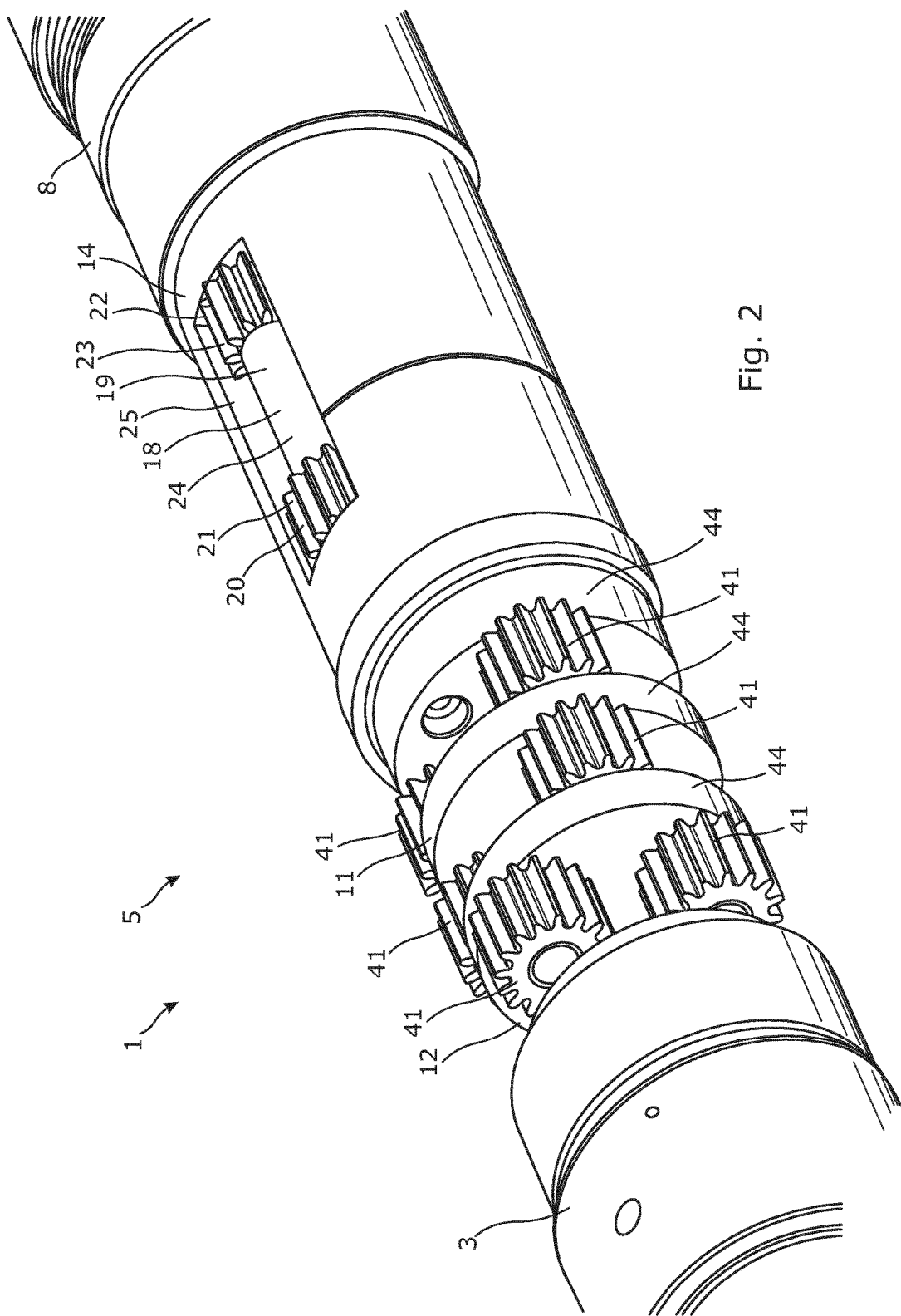
FIG. 2 shows part of the downhole tool string of FIG. 1.

FIG. 2 discloses a part of the downhole tool string in which a housing has been removed. In FIG. 2, the downhole tool string 1 is shown comprising the motor unit 3, the gear section 5 and the pump unit 8. The gear section 5 comprises a reduction gear assembly 11 having a first end part 12 closest to the motor unit and a second end part 14 rotating at a lower speed than the output of the motor unit 3. The reduction gear assembly 11 is driven by the motor unit 3 and reduces the rotational speed before feeding the rotational speed to the operational tool. The reduction gear assembly 11 is a multi-stage planetary gearing assembly having planet gears 41 rotated by a sun gear (shown in FIG. 3 by reference number 42) on a rotational shaft (output shaft) of the motor unit 3. The planet gears 41 rotate a carrier plate 44 engaging teeth 28 (shown in FIG. 3) in the housing, which is stationary, in order to rotate the second end part 14 of the reduction gear assembly 11 at a lower speed than that of the motor unit 3. The gear section 5 further comprises a transition gear assembly 18 arranged at the second end part 14 of the reduction gear assembly 11. The transition gear assembly 18 comprises a transition shaft 19 having a first shaft end 20 having a first toothed part 21, and a second shaft end 22 having a second toothed part 23. The function of the transition gear assembly 18 is to transfer the rotations of the motor unit 3 in order to drive the pump unit 8. As can be seen, the transition shaft 19 is arranged in a cavity 25 of the second end part 14. As shown in FIG. 4, the second end part 14 has three cavities distributed evenly around the circumference of the tool string, and in each cavity, a transition shaft 19 is arranged.

Figure 3:
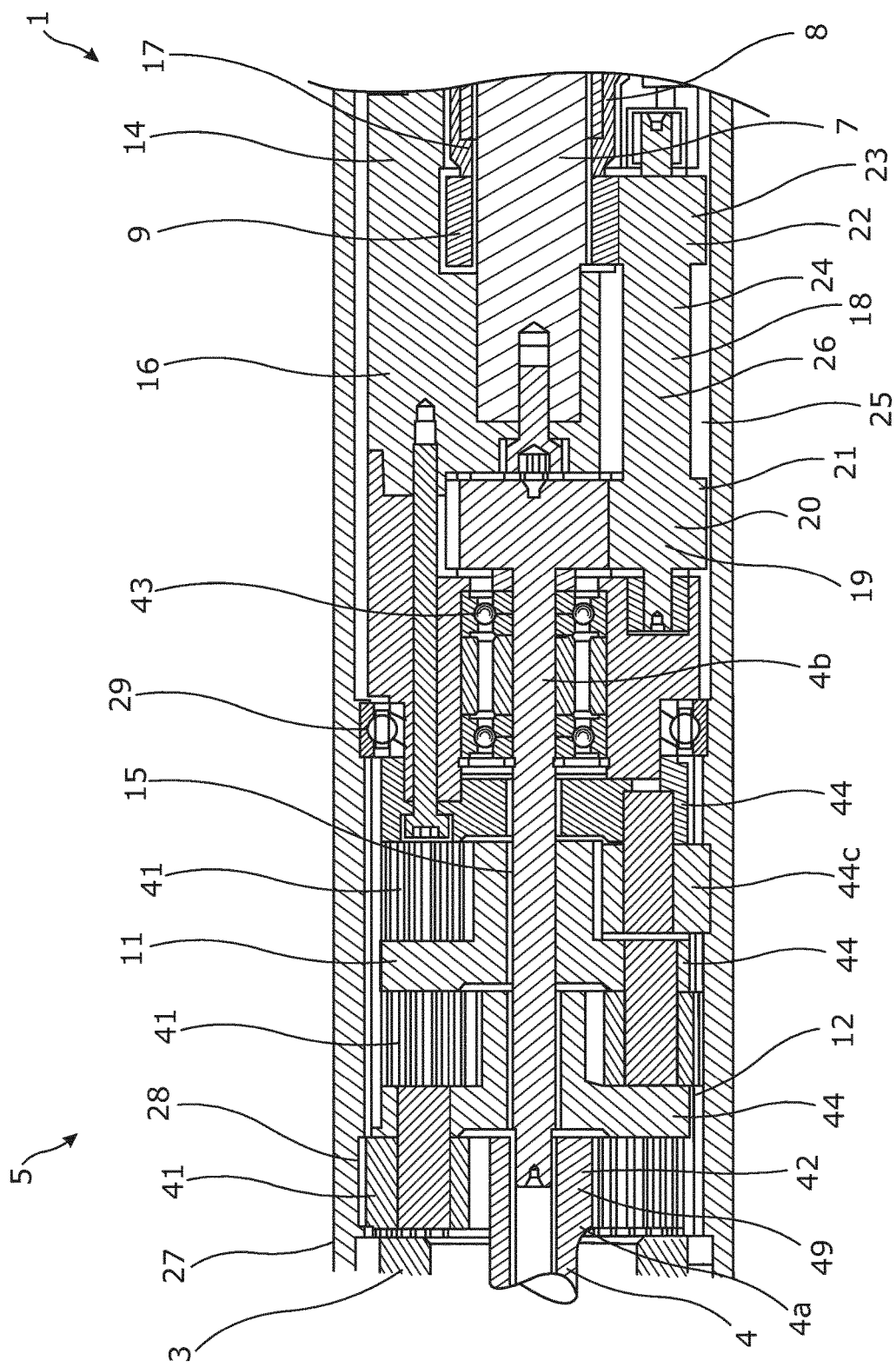
FIG. 3 shows a cross-sectional view of part of the downhole tool string along a longitudinal axis of the tool string.
Figure 4:
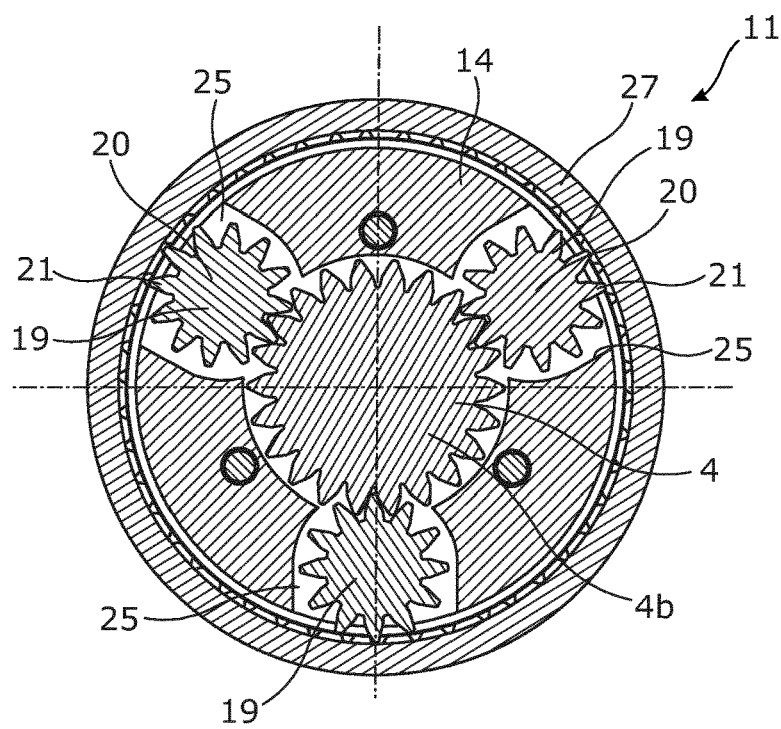
FIG. 4 shows a cross-sectional view of the downhole tool string of FIG. 3 perpendicular to the longitudinal axis of the tool string.

In FIG. 3, the gear section 5 is shown in cross-section. The reduction gear assembly 11 is a three-stage planetary gear assembly. The first end part 12 of the reduction gear assembly 11 is closest to the motor unit 3 and engages the rotational shaft 4 of the motor unit 3. The reduction gear assembly 11 reduces the rotational speed so that the second end part 14 rotates at a lower speed than the rotational shaft. The second end part 14 of the reduction gear assembly 11 is connected to the tool shaft 7 in a connection area 16, and the operational tool is thereby driven at a lower speed than the motor unit 3.

The reduction gear assembly 11 of FIG. 3 has a through-bore 15 through which the rotational shaft 4 extends so that the rotation of the rotational shaft can be transferred to the rotor shaft 9 of the pump unit 8. The rotational shaft 4 may be mounted from several shaft parts 4a, 4b. The sun gear 42 is formed on the rotational shaft 4, 4a and engages the planet gears 41 in the reduction gear assembly 11. The planet gears 41 are arranged on the carrier plate 44 connected to the sun gear 42 in the next stage. The third carrier plate 44c in the third stage forms part of the second end part 14 of the reduction gear assembly 11 which in the connection area 16 engages the tool shaft 7.

In FIG. 3, the rotor shaft 9 of the pump unit 8 has a pump through-bore 17 through which the tool shaft 7 extends. The output of the gear section is thus a double shaft where the tool shaft 7 rotates within the rotor shaft 9 at a lower rotational speed than that of the rotor shaft 9. Thus, the pump unit 8 is rotated at a higher speed than the tool shaft 7 of the operational tool.

The transition gear assembly 18 arranged at the second end part 14 of the reduction gear assembly 11 comprises the transition shaft 19 having the first shaft end 20 having the first toothed part 21 engaging the rotational shaft. The transition shaft 19 further comprises the second shaft end 22 having a second toothed part 23 engaging the rotor shaft 9. The transition shaft has an un-toothed part 24 between the first and second toothed parts 21, 23 so that the un-toothed part 24 bridges over the connection area 16. Thus, the transition gear assembly 18 enables the rotation of the reduction gear assembly 11 to switch places with the rotation of the rotational shaft 4 so that the low speed parts switch places with the high speed parts before being fed to the pump unit 8 and the operation tool 6 through the pump unit.

As can be seen in FIG. 3, the transition shaft 19 is arranged in the second end part 14 of the reduction gear assembly 11. The transition shaft has a centre axis 26 and rotates around the centre axis within the cavity 25 of the second end part 14 while the second end part also rotates at a lower speed than the transition shaft. Thus, the transition shaft also rotates around the rotational shaft 4. The rotational shaft 4 rotates at 5,000-10,000 rpm, and the second end part 14 of the reduction gear assembly 11 rotates at 50-500 rpm, meaning that the operational tool is rotated at 50-500 rpm while the rotor shaft 9 of the pump unit 8 is rotated at 5,000-10,000 rpm. The transfer of rotation from the rotational shaft 4 via the transition shaft to rotor shaft 9 may increase the rotation so that the rotor shaft rotates at a higher rotational speed than the rotational shaft 4.

Furthermore, at least one bearing 43 is arranged between the rotational shaft 4 and the second end part 14 of the reduction gear assembly 11, allowing them to rotate at different speeds. Other bearings 29 may be arranged between the rotational parts, such as between the reduction gear assembly 11 and the stationary housing. The pump unit 8 is connected to the stationary housing 27, and the pump unit 8 has a rotor shaft 9 rotating in relation to a stator.

FIG. 4 discloses three transition shafts 19, each arranged in a cavity 25 in the second end part 14 of the reduction gear assembly 11. In the cross-section of FIG. 4, the first toothed part 21 of the first shaft end 20 of the transition shaft 19 engages the rotational shaft 4 and is surrounded by the housing 27.

Figure 5:
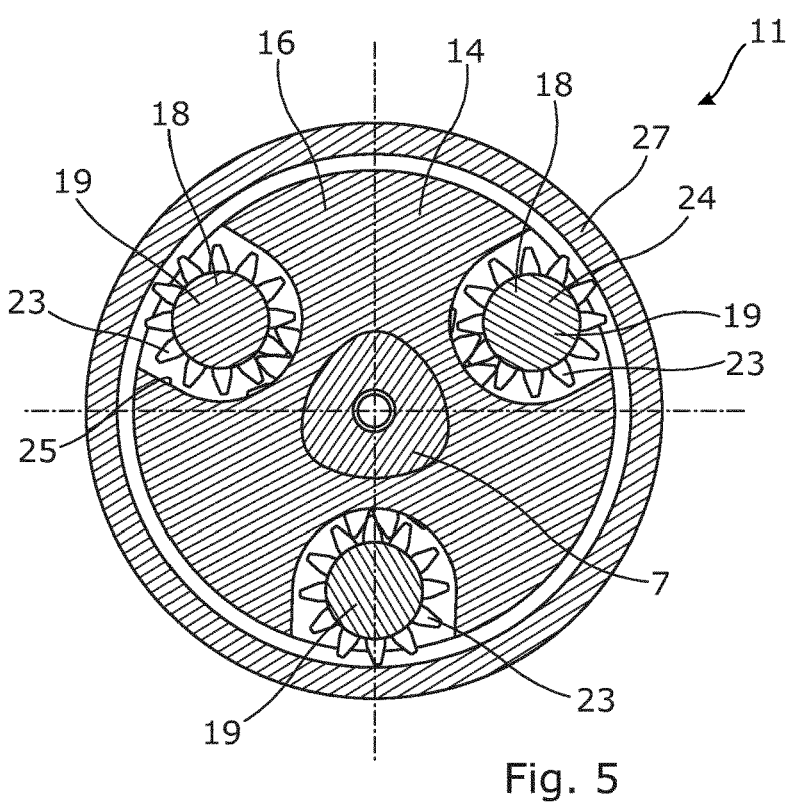
FIG. 5 shows another cross-sectional view of the downhole tool string of FIG. 3 perpendicular to the longitudinal axis of the tool string.

In the cross-section of FIG. 5, the connection area 16 is shown in which the second end part 14 of the reduction gear assembly engages the tool shaft 7. The transition shaft 19 is seen through its un-toothed part 24, illustrating the bridge which the transition shaft 19 forms over the connection area 16.

Figure 6:
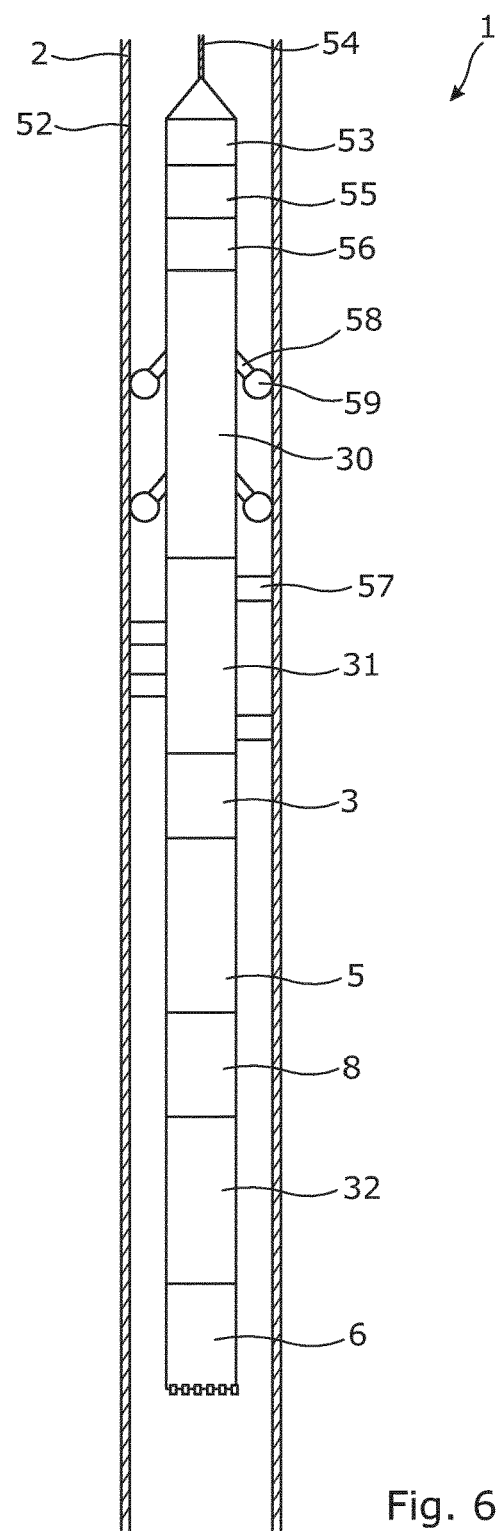
FIG. 6 shows another downhole tool string.
Figure 7:
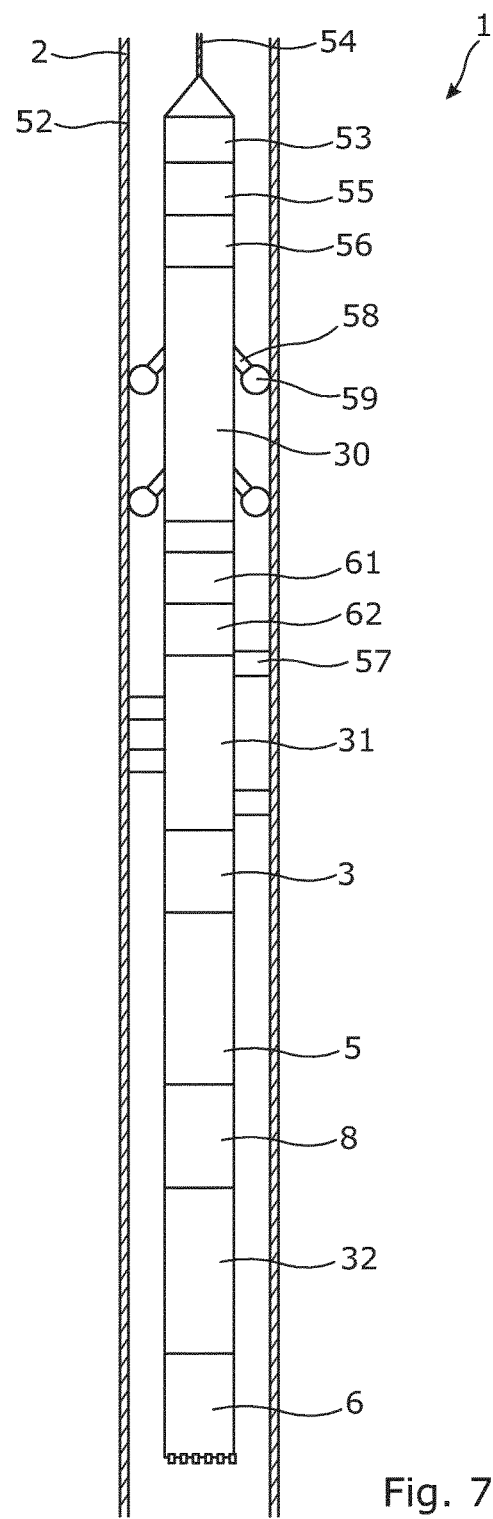
FIG. 7 shows yet another downhole tool string.

The downhole tool string 1 of FIG. 6 comprises a driving unit 30, in the form of a downhole tractor and an anchoring section 31 for fastening the tool string in the well casing 52 while performing an operation. The downhole tool string 1 further comprises a cleaner section 32 arranged between the operational tool 6 and the pump unit 8 and around the tool shaft, so that elements released while the operational tool is operating are sucked into the cleaner section and accumulated therein. The operational tool 6 is a milling tool or a drilling tool. The downhole tool string 1 further comprises an electronic section 53 powered and controlled through a wireline 54 in order to control the functions of the tool string 1. The downhole tool string 1 of FIG. 6 comprises a second motor 55 for driving a second pump 56 to generate pressurised fluid to drive the downhole tractor 30, the second motor 55 and the second pump 56 being reused to project fixation units 57 of the anchoring section 31. In another embodiment shown in FIG. 7, the downhole tool string 1 further comprises a third motor 61 and a third pump 62 for driving the project fixation units 57 of the anchoring section 31.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

In the event that the tool is not submergible all the way into the casing, a downhole tractor can be used to push the tool all the way into position in the well. The downhole tractor may have projectable arms 58 having wheels 59, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole tool string for performing an operation downhole in a well having a well fluid, the downhole tool string having an outer diameter and comprising:
   a motor unit having a rotational shaft rotating with a rotational motor speed,
   a gear section,
   an operational tool having a tool shaft rotated by the gear section at a lower rotational speed than that of the rotational shaft, and
   a pump unit having a rotor shaft rotated by the motor unit configured to provide well fluid around or past the operational tool,
   wherein the pump unit is arranged between the gear section and the operational tool,
   wherein the gear section comprises a reduction gear assembly having a first end part closest to the motor unit, the first end part engaging the rotational shaft, and the reduction gear assembly further having a second end part rotating at a lower speed than the rotational shaft, and wherein the gear section comprises a transition gear assembly arranged at the second end part of the reduction gear assembly, the transition gear assembly comprising a transition shaft having a first shaft end having a first toothed part, and a second shaft end having a second toothed part, the first toothed part engaging the rotational shaft and the second toothed part engaging the rotor shaft, so that the rotation of the rotational shaft is transferred to the rotor shaft.

2. A downhole tool string according to claim 1, wherein the outer diameter of the downhole tool string is less than 54 mm.

3. A downhole tool string according to claim 1, wherein the pump unit comprises a pump inlet in fluid communication with the well fluid.

4. A downhole tool string according to claim 1, wherein the reduction gear assembly has a through-bore through which the rotational shaft extends.

5. A downhole tool string according to claim 1, wherein the second end part of the reduction gear assembly is connected to the tool shaft in a connection area.

6. A downhole tool string according to claim 1, wherein the reduction gear assembly is a planetary gearing assembly.

7. A downhole tool string according to claim 1, wherein the rotor shaft of the pump unit has a pump through-bore through which the tool shaft extends.

8. A downhole tool string according to claim 1, wherein the transition shaft has an un-toothed part between the first and second toothed parts, the un-toothed part bridging over the connection area.

9. A downhole tool string according to claim 1, wherein the second end part of the reduction gear assembly comprises one or more cavity/ies in which the transition shaft(s) is/are arranged.

10. A downhole tool string according to claim 1, wherein the transition shaft is arranged in the second end part of the reduction gear assembly.

11. A downhole tool string according to claim 1, wherein the transition shaft rotates at a rotational speed being greater than that of the second end part of the reduction gear assembly.

12. A downhole tool string according to claim 11, wherein the rotational shaft rotates at 5,000-10,000 rpm and the second end part of the reduction gear assembly rotates at 50-500 rpm, so that the operational tool is rotated at 50-500 rpm while the rotor shaft of the pump unit is rotated at 5,000-10,000 rpm.

13. A downhole tool string according to claim 1, wherein the gear section is configured to rotate the rotor shaft of the pump unit at a speed that is greater than the speed of the tool shaft of the operational tool.

14. A downhole tool string according to claim 1, wherein the motor unit is an electrical motor unit configured to rotate the rotating shaft.

15. A method for operating an operational tool and pump unit of a downhole tool string according to claim 1 via the rotational shaft of the motor unit, comprising:
  activating the motor unit to rotate the rotational shaft at a first rotation speed,
  rotating the first end part of the reduction gear assembly by means of the rotational shaft,
  reducing the rotations of the second end part to a second rotation speed,
  rotating the tool shaft by means of the second end part of the reduction gear assembly,
  rotating the transition shaft by means of the rotational shaft,
  rotating the rotor shaft of the pump unit by means of the transition shaft, and
  pumping well fluid around or past the operational tool while the operational tool rotates.

* * * * *